(12) United States Patent
Kulkarni et al.

(10) Patent No.: US 10,877,876 B2
(45) Date of Patent: Dec. 29, 2020

(54) SYSTEM AND METHOD FOR AUTOMATED THIN CLIENT CONTACT CENTER AGENT DESKTOP TESTING

(71) Applicant: Cyara Solutions Pty Ltd, Melbourne (AU)

(72) Inventors: Alok Kulkarni, Glen Iris (AU); Geoff Willshire, Yeronga (AU)

(73) Assignee: CYARA SOLUTIONS PTY LTD, Melbourne (AU)

( * ) Notice: Subject to any disclaimer, the term of this patent is extended or adjusted under 35 U.S.C. 154(b) by 0 days.

(21) Appl. No.: 16/385,051

(22) Filed: Apr. 16, 2019

(65) Prior Publication Data

US 2019/0340115 A1  Nov. 7, 2019

Related U.S. Application Data (63) Continuation of application No. 15/491,965, filed on Apr. 19, 2017, now Pat. No. 10,268,571, which is a continuation-in-part of application No. 15/083,259, filed on Mar. 28, 2016, now Pat. No. 10,659,402, which is a continuation-in-part of application No. 14/854,023, filed on Sep. 14, 2015, now abandoned, which is a continuation of application No. 14/141,424, filed on Dec. 27, 2013, now Pat. No. 9,137,184, which is a continuation of application No.
(Continued)

(51) Int. Cl.
| | |
|---|---|
| *H04M 3/28* | (2006.01) |
| *H04M 3/51* | (2006.01) |
| *H04M 3/32* | (2006.01) |
| *G06F 11/36* | (2006.01) |
| *H04L 29/08* | (2006.01) |
| *H04L 12/24* | (2006.01) |
| *H04L 12/26* | (2006.01) |
| *H04L 12/58* | (2006.01) |

(52) U.S. Cl.
CPC ...... *G06F 11/3688* (2013.01); *G06F 11/3684* (2013.01); *G06F 11/3692* (2013.01); *H04L 41/5038* (2013.01); *H04L 43/50* (2013.01); *H04L 51/02* (2013.01); *H04L 51/046* (2013.01); *H04L 51/14* (2013.01); *H04L 67/02* (2013.01); *H04M 3/28* (2013.01); *H04M 3/5133* (2013.01); *H04L 41/5083* (2013.01); *H04L 41/5093* (2013.01); *H04M 3/323* (2013.01); *H04M 3/5175* (2013.01)

(58) Field of Classification Search
USPC .................................................... 714/38.14
See application file for complete search history.

(56) References Cited

U.S. PATENT DOCUMENTS

| | | | |
|---|---|---|---|
| 2004/0008825 A1* | 1/2004 | Seeley ................ | H04M 3/50 379/32.01 |
| 2013/0246853 A1* | 9/2013 | Salame .............. | G06F 11/3688 714/37 |

* cited by examiner

*Primary Examiner* — Amal S Zenati
(74) *Attorney, Agent, or Firm* — Brian R. Galvin; Galvin Patent Law LLC (57) ABSTRACT

A system for centralized testing of web-based agent desktops has been devised. The invention uses a test control portal. The test control portal acts as the interface between the client interaction software systems testing system and analyst controlled test device, executes an extensive set of robust test directive commands with underlying routines to be used to specify test conditions without the use of programming ability on the part of the analyst, uses a robust set of report item and format choice designators to allow easy selection of a range of report content and styles.

10 Claims, 7 Drawing Sheets

Related U.S. Application Data

13/936,186, filed on Jul. 6, 2013, now abandoned, and a continuation-in-part of application No. 14/140,449, filed on Dec. 24, 2013, now Pat. No. 9,137,183, which is a continuation of application No. 13/936,147, filed on Jul. 6, 2013, now abandoned, which is a continuation-in-part of application No. 13/567,089, filed on Aug. 6, 2012, now abandoned, and a continuation-in-part of application No. 12/644,343, filed on Dec. 22, 2009, now Pat. No. 8,625,772, application No. 16/385,051, filed on Apr. 16, 2019, which is a continuation of application No. 15/491,965, filed on Apr. 19, 2017, now Pat. No. 10,268,571, which is a continuation-in-part of application No. 15/157,384, filed on May 17, 2016, now Pat. No. 10,230,836, which is a continuation of application No. 14/709,252, filed on May 11, 2015, now Pat. No. 9,344,556, which is a continuation of application No. 14/140,470, filed on Dec. 25, 2013, now Pat. No. 9,031,221, which is a continuation of application No. 13/936,183, filed on Jul. 6, 2013, now abandoned, which is a continuation-in-part of application No. 13/567,089, filed on Aug. 6, 2012, now abandoned, and a continuation-in-part of application No. 12/644,343, filed on Dec. 22, 2009, now Pat. No. 8,625,772, application No. 16/385,051, filed on Apr. 16, 2019, which is a continuation of application No. 15/491,965, filed on Apr. 19, 2017, now Pat. No. 10,268,571, which is a continuation-in-part of application No. 15/083,259, filed on Mar. 28, 2016, now Pat. No. 10,659,402, which is a continuation-in-part of application No. 14/854,023, filed on Sep. 14, 2015, now abandoned, which is a continuation of application No. 14/141,424, filed on Dec. 27, 2013, now Pat. No. 9,137,184, which is a continuation of application No. 13/936,186, filed on Jul. 6, 2013, now abandoned, which is a continuation-in-part of application No. 13/936,147, filed on Jul. 6, 2013, now abandoned.

SYSTEM AND METHOD FOR AUTOMATED THIN CLIENT CONTACT CENTER AGENT DESKTOP TESTING

CROSS-REFERENCE TO RELATED APPLICATIONS

| Application No. | Date Filed | Title |
|---|---|---|
| Current application | Herewith | SYSTEM AND METHOD FOR AUTOMATED THIN CLIENT CONTACT CENTER AGENT DESKTOP TESTING |
| | | Is a continuation of: |
| 15/491,965 | Apr. 19, 2017 | SYSTEM AND METHOD FOR AUTOMATED THIN CLIENT CONTACT CENTER AGENT DESKTOP TESTING |
| | | which is a continuation-in-part of: |
| 15/083,259 | Mar. 28, 2016 | SYSTEM AND METHOD FOR AUTOMATED END-TO-END WEB INTERACTION TESTING |
| | | which is a continuation-in-part of: |
| 14/854,023 | Sep. 14, 2015 | SYSTEM AND METHOD FOR AUTOMATED CHAT TESTING |
| | | which is a continuation of: |
| 14/141,424 Issued 9,137,184 | Dec. 27, 2013 Issue date Sep. 15, 2015 | SYSTEM AND METHOD FOR AUTOMATED CHAT TESTING |
| | | which is a continuation of: |
| 13/936,186 | Jul. 6, 2013 | SYSTEM AND METHOD FOR AUTOMATED CHAT TESTING |
| | | and is also a continuation-in-part of: |
| 14/140,449 Issued 9,137,183 | Dec. 24, 2013 Issue date Sep. 15, 2015 | SYSTEM AND METHOD FOR AUTOMATED CHAT TESTING |
| | | which is a continuation of: |
| 13/936,147 | Jul. 6, 2013 | SYSTEM AND METHOD FOR AUTOMATED CHAT TESTING |
| | | which is a continuation-in-part of: |
| 13/567,089 | Aug. 6, 2012 | SYSTEM AND METHOD FOR AUTOMATED ADAPTATION AND IMPROVEMENT OF SPEAKER AUTHENTICATION IN A VOICE BIOMETRIC SYSTEM ENVIRONMENT |
| | | which is a continuation-in-part of: |
| 12/644,343 Issued 8,625,772 | Dec. 22, 2009 Issued date Jan. 7, 2014 | INTEGRATED TESTING PLATFORM FOR CONTACT CENTRES |
| Current application | Herewith | SYSTEM AND METHOD FOR AUTOMATED THIN CLIENT CONTACT CENTER AGENT DESKTOP TESTING |
| | | is a continuation of: |
| 15/491,965 | Apr. 19, 2017 | SYSTEM AND METHOD FOR AUTOMATED THIN CLIENT CONTACT CENTER AGENT DESKTOP TESTING |
| | | which is also a continuation-in-part of: |
| 15/157,384 | May 17, 2016 | SYSTEM AND METHOD FOR AUTOMATED VOICE QUALITY TESTING |
| | | which is a continuation of: |
| 14/709,252 Issued 9,344,556 | May 11, 2015 Issue date May 17, 2016 | SYSTEM AND METHOD FOR AUTOMATED VOICE QUALITY TESTING |
| | | which is a continuation of: |
| 14/140,470 Issued 9,031,221 | Dec. 25, 2013 Issue date May 12, 2015 | SYSTEM AND METHOD FOR AUTOMATED VOICE QUALITY TESTING |
| | | which is a continuation of: |
| 13/936,183 | Jul. 6, 2013 | SYSTEM AND METHOD FOR AUTOMATED VOICE QUALITY TESTING |
| | | which is a continuation-in-part of: |
| 13/567,089 | Aug. 6, 2012 | SYSTEM AND METHOD FOR AUTOMATED ADAPTATION AND IMPROVEMENT OF SPEAKER AUTHENTICATION IN A VOICE BIOMETRIC SYSTEM ENVIRONMENT |
| | | which is a continuation-in-part of: |
| 12/644,343 Issued 8,625,772 | Dec. 22, 2009 Issue date Jan. 7, 2014 | INTEGRATED TESTING PLATFORM FOR CONTACT CENTRES |

-continued

| Application No. | Date Filed | Title |
|---|---|---|
| Current application | Herewith | SYSTEM AND METHOD FOR AUTOMATED THIN CLIENT CONTACT CENTER AGENT DESKTOP TESTING |
| | | Is a continuation of: |
| 15/491,965 | Apr. 19, 2017 | SYSTEM AND METHOD FOR AUTOMATED THIN CLIENT CONTACT CENTER AGENT DESKTOP TESTING |
| | | which is a continuation-in-part of: |
| 15/083,259 | Mar. 28, 2016 | SYSTEM AND METHOD FOR AUTOMATED END-TO-END WEB INTERACTION TESTING |
| | | which is a continuation-in-part of: |
| 14/854,023 | Sep. 14, 2015 | SYSTEM AND METHOD FOR AUTOMATED CHAT TESTING |
| | | which is a continuation of: |
| 14/141,424 Issued 9,137,184 | Dec. 27, 2013 Issue date Sep. 15, 2015 | SYSTEM AND METHOD FOR AUTOMATED CHAT TESTING |
| | | which is a continuation of: |
| 13/936,186 | Jul. 6, 2013 | SYSTEM AND METHOD FOR AUTOMATED CHAT TESTING |
| | | which is a continuation-in-part of: |
| 13/936,147 | Jul. 6, 2013 | SYSTEM AND METHOD FOR AUTOMATED CHAT TESTING | the entire specification of each of which is incorporated herein by reference.

BACKGROUND OF THE INVENTION

Field of the Art

The disclosure relates to the field of system testing, and more particularly to the field of automated quality assurance testing of thin client contact center agent desktop functionality.

Discussion of the State of the Art

As web-browser based customer relationship management solutions used by contact centers, whether a single monolithic service or a set multiple service offerings from a number of vendors which together perform all needed tasks, have become more complex so have systems and techniques to needed monitor and test them. The ability to qualify new software versions and variants on the entire range of hardware types expected to be deployed, to qualify new hardware or software combinations as they arise, or to monitor functional efficiency during events of unacceptable responsiveness under conditions mimicking the actual live usage, has become much more important. These types of test software, running on either dedicated equipment or on live equipment under instances of low live traffic are now available, but are currently inflexible in deployment, requiring significant preplanning and hardware resources, have little modification capability while running, lack the ability to run unobtrusively, and thus can not be used to diagnose problems encountered during actual call center use, have inflexible result reporting abilities and require a significant amount of programming knowledge to administer.

What is needed are computer service package testing suites that are easy and flexible to deploy, that accept modifications without the use of complex procedures while running, that have highly configurable and easily specified reporting formats and that can be controlled through a centralized gateway using simplified runtime commands instead of programmatic changes to the suites themselves.

SUMMARY OF THE INVENTION

Accordingly, the inventor has conceived and reduced to practice, a system and method for automated thin client contact center agent desktop testing which has a single interface, does not need significant programming ability to operate, automates many types of testing and allocates resources and pre-loads test payloads.

According to a preferred embodiment of the invention, a system and method for conducting centrally controlled, robust and easily customized usage testing of web-based customer relationship manager systems (CRM) has been created. This centralized test suite may execute testing of both voice and chat interaction software in conjunction with any support software frequently used by the contact center to accomplish customer relationship management tasks using cloud service based, thin client agent desktops. Use of servers each executing multiple headless virtual web-browsers allows many iterations of each programmed test plan to be run concurrently without the need for large number of actual workstations. Results of each test may be categorized and information depth dictated by the test analysts. Test setup is accomplished using a robust set of simple test directive commands and modifying parameters which insulates the analyst from the underlying programming. Commands and parameters can be strung together to form more complex test conditions. The suite is such that stopping or modifying a test under execution can be accomplished without catastrophic test disruption of programming knowledge of test execution.

According to a preferred embodiment of the invention, a system for automated thin client contact center agent desktop testing, comprising: a control portal module stored in the memory of and operating on a processor of a computing device and configured to: accept runtime commands and parameters directing the operation of a thin client contact center consumer relationship manager test; and incorporates the runtime commands and parameters entered into a system resident test programming framework to produce a custom system executable thin client contact center agent desktop test plan; a test control module stored in the memory of and operating on a processor of a computing device and configured to: retrieve the custom system executable thin client contact center agent desktop test plan from the control portal module; assign each custom system executable thin client contact center agent desktop test plan prescribed interaction between a system generated virtual call center agent and a a system generated virtual customer to an available virtual headless web browser; direct execution of all custom system executable thin client contact center agent desktop test plan prescribed tasks within each interaction between a system generated virtual call center agent and a system generated virtual customer; collect pre-defined run-time data that results from execution of all custom system executable thin client contact center agent desktop test plan prescribed tasks within each interaction between a system generated virtual call center agent and a system generated virtual customer; an output module stored in the memory of and operating on a processor of a computing device and configured to display result data in a format pre-defined by the custom system executable thin client contact center agent desktop test plan is disclosed.

According to another embodiment of the invention, a system for automated thin client contact center agent desktop testing has been developed wherein the runtime commands and parameters may come from a test command and parameter data store, wherein the runtime commands and parameters may come from interactive entry by an analyst using an attached interactive device, wherein at least two runtime commands and parameters are strung together to form more complex, customized test suites where the test control module flags any incompatible combinations should they arise, wherein results from several iterations of at least one test is stored to allow for retrospective analysis of efficiency changes over long periods of time, and wherein at least one of the runtime commands and its parameters commands is graphically represented and selected by a pictogram.

According to another embodiment of the invention, a method for automated thin client contact center agent desktop testing, comprising the steps of: receiving test analyst directive commands and parameters and result report specifications from a human interface device using a control portal which is stored in a memory and operating on a processor of a network-connected computing device, developing a system executable test plan from the test analyst directive commands and parameters using a control portal, allocating virtual web browser instances for web based agent desktop testing based upon either pre-programmed parameters retrieved from the control portal using a test control module which is stored in a memory and operating on a processor of a network-connected computing device, running web based agent desktop testing plan directives on allocated virtual web browser instances using the test control module; and presenting the results data in a format best suited to goal of a study or desires of the analyst using preprogrammed specifications using an output module which is stored in a memory and operating on a processor of a network-connected computing device is disclosed.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

DETAILED DESCRIPTION

The inventor has conceived, and reduced to practice, in a preferred embodiment of the invention, a system and method for automated contact center agent desktop testing.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Conceptual Architecture

Figure 1:
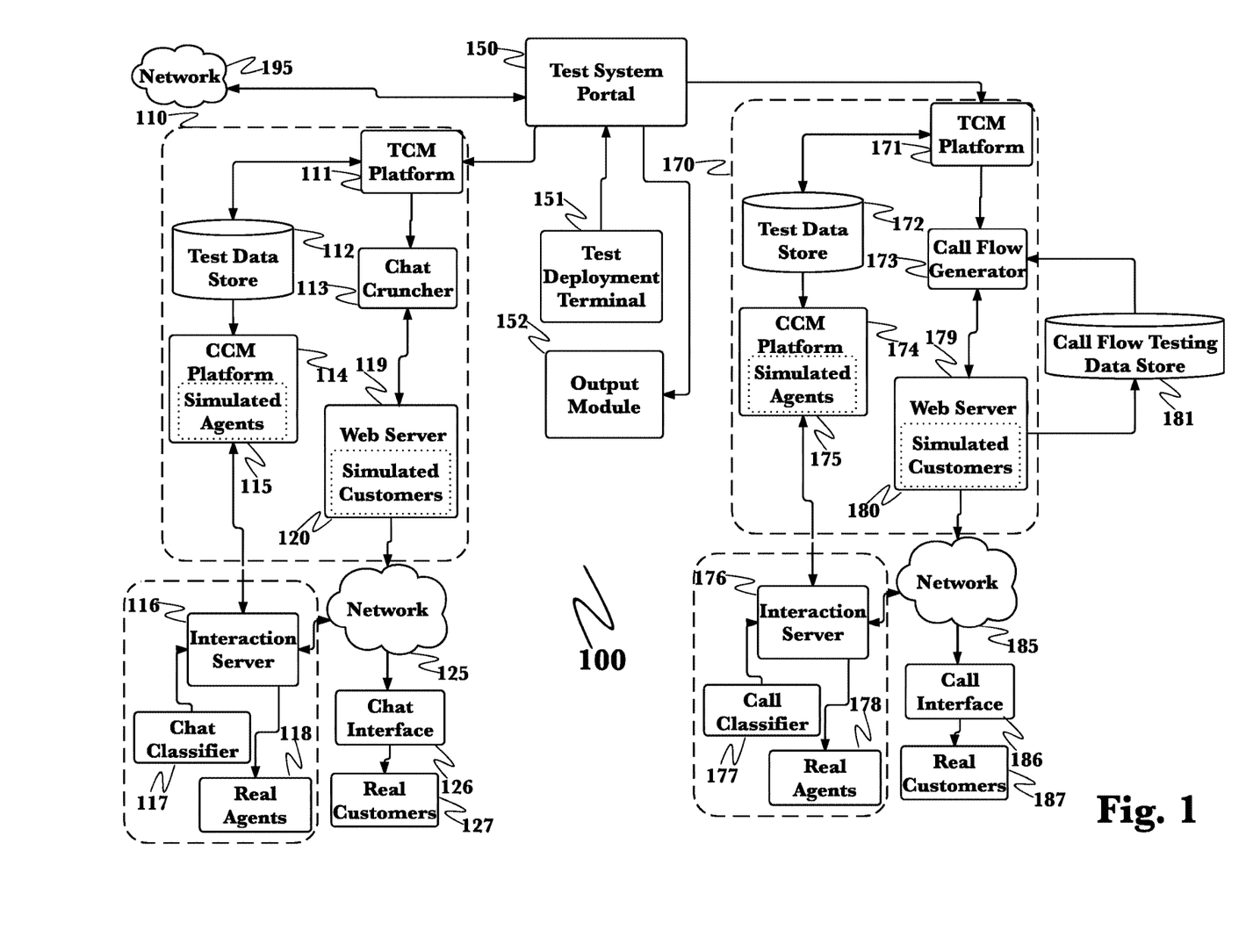
FIG. 1 is a block diagram illustrating an exemplary system architecture for a system for improved deployment of automated web-based agent desktop testing services, according to a preferred embodiment of the invention.
Figure 2:
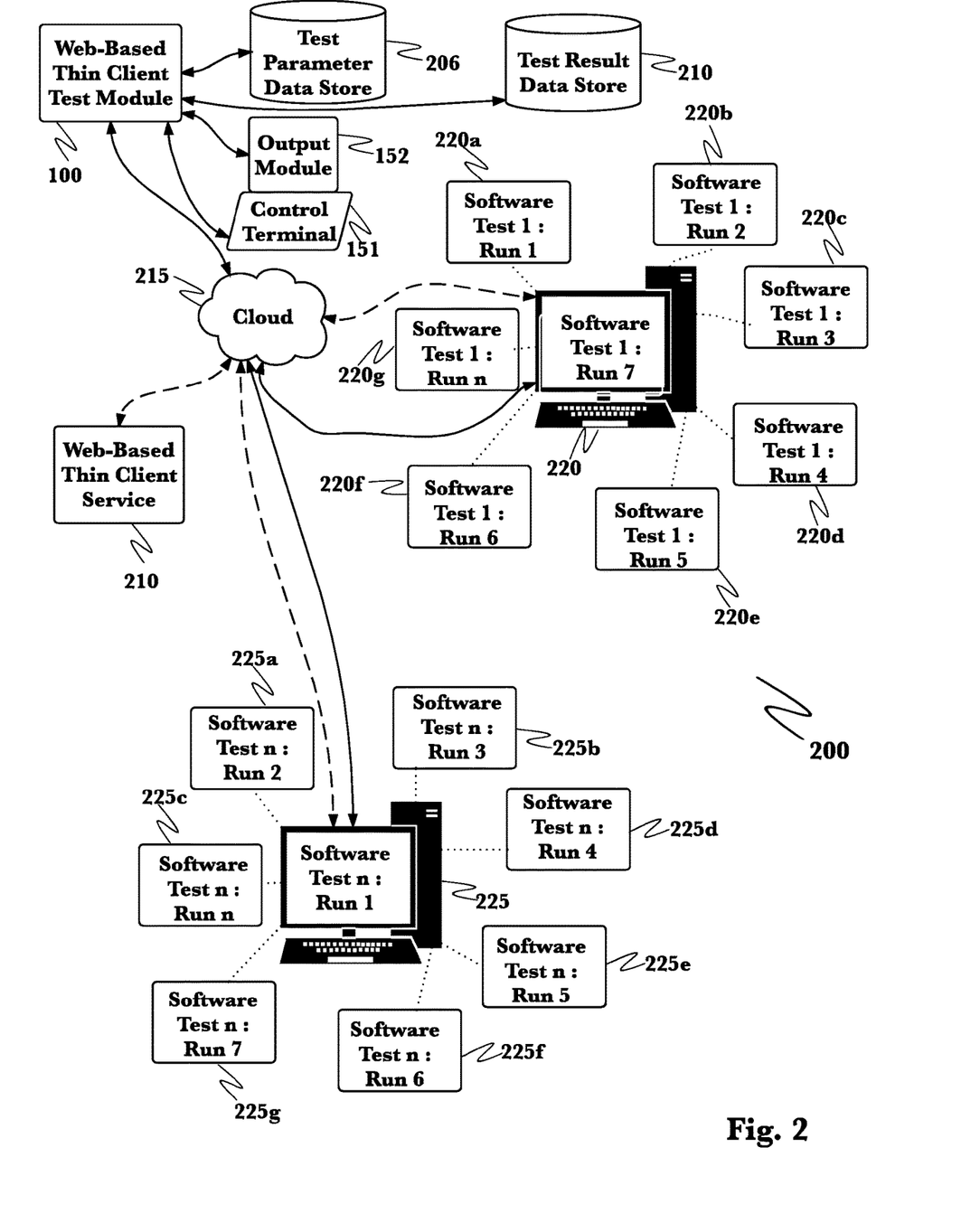
FIG. 2. is a system diagram illustrating exemplary use a plurality of headless web browsers to run specially developed web versions of the end-to-end voice and end-to-end chat test software, according to a preferred embodiment of the invention.

FIG. 1 is a block diagram illustrating an exemplary system architecture 100 for a system for improved deployment of automated web-based agent desktop testing services, according to a preferred embodiment of the invention. End-to-end contact center testing systems are invariably quite complex and may greatly benefit from a deployment system that allows scheduling, initiation, specification management and allocation of resources for a wide range of analyses without the need for extensive programming knowledge on the part of the analyst. 110 is a block diagram of a preferred embodiment of the invention, illustrating a system for automated chat testing incorporating common contact center elements and running in parallel to actual contact center operations. As illustrated, a contact center 110 may implement a test case management (TCM) platform 111, which may serve as the beginning or origin of a test case. TCM platform 111 may operate automatically or optionally may accept human interaction at a test system portal 150, in some cases via a local test control terminal with a graphical user interface 151 for manipulation of test cases using runtime commands and parameters rather than modification of test function code and viewing 152 of both interim and final test result reports which may also be stored in a testing database 112. Other embodiments may employ a networked test deployment terminal and output module (not shown) which may connect from a great distance using a virtual private network or similar secure long distance connection familiar to those skilled in the art. When a test is run, TCM platform 111 initiates a test case with chat cruncher 113 and contact center manager (CCM) platform 114, which may each then begin their respective automated testing processes. Chat cruncher 114 may simulate a plurality of virtual customers 120 which operate via a web server 119 to send and receive data via internet or other data communications network 125, while CCM platform 114 may similarly simulate virtual contact center agents 115 which may receive and respond to data requests on each of plurality of virtual agent desktop instances as shown in FIG. 2. Data requests sent by simulated customers 120 via a data network 125 may be forwarded to an interaction server 116 and requests from agents to customers via a data network 125. Interaction server 116 may verify data requests with a chat classifier 117, which may identify requests as part of a test case or actual contact center operations, to determine handling protocol as the embodiment is capable of running embedded in the customer's live contact center infrastructure. If a request is determined to be a part of a test case, interaction server 116 may then proceed with test case handling. If a request is inbound from data network 125, it may be forwarded to CCM platform 114 for handling by virtual agents 115, or if it is an outbound request from a virtual agent 115 it may be sent to data network 125 for transmission to a virtual customer 120. Virtual agents 115 may operate by interacting directly with interaction server 116 or by automatically interacting with a simulated agent desktop environment according to the specific nature of a test case. During and/or after the execution of a test case, data may be stored in a data store 112 by CCM platform 114 or chat cruncher 113, for the formulation of test reports to be stored for later viewing by a user via TCM platform 111. In this manner it will be appreciated that the flow of data requests within a test case is bidirectional, i.e. requests may continually and asynchronously be sent from simulated customers 120 to simulated agents 115 and vice-versa, without necessitating a strict pattern or rhythm of data flow. It will be appreciated that in such a manner it is possible to simulate a customer sending multiple chat requests while an agent waits to send a response, or for an agent to send multiple requests while a customer waits. Such occurrences are commonplace in practice, and in this manner a test case may more accurately simulate actual contact center operations for more relevant and reliable testing data.

As illustrated according to the embodiment, normal operations may continue uninterrupted within a contact center 110 while a test case is being performed. Customers 127, 128 may continue to operate a chat interface 126 or call interface 186 as normal without any impact on their customer experience from a test case, sending chat requests and calls to contact center agents 118, 178 according to the flow illustrated. Chat requests may be sent from a chat interface 126 via a data network 125, requests may then be received and handled within a contact center. There the requests may then travel to an interaction server 116, which may then verify requests with a chat classifier 117 to determine their nature as legitimate customer interaction. Requests may then be sent to agents 118, and return requests follow an opposite path through interaction server 116, and then outward from contact center 110 via a data network 125 to a customer's chat interface 126. In this manner it will be appreciated that normal contact center operations may be running in parallel to test cases, without any impact on customer experience.

Contact center voice interaction with customers may place significantly more load on an agent's workstation and web-based CRM client software running upon it as many such packages employ soft-phones and voice requires a wider bandwidth to present, and there may be speech to text transcription functions to perform. There is also some pressure to provide a faster response during voice interaction which may lead to increased concurrent use of a wide range of software resources in a voice interaction environment. 170 is a block diagram of a preferred embodiment of the invention, illustrating a system for automated voice calls testing incorporating common contact center elements and running in parallel to actual contact center operations. As illustrated, a contact center 170 may implement a test case management (TCM) platform 171, which may serve as the beginning or origin of a test case. TCM platform 171 may operate automatically or optionally may accept human interaction at a test system portal 150, in some cases via a local test control terminal with a graphical user interface 151 for manipulation of test cases and viewing 152 of both interim and final test result reports which may be stored in a testing database 172. These results may be initially displayed using dashboard or carrousel type format or agent workstation and CRM client functional parameters and may include additional windows which may include, current applications open, or streaming screenshots from the test agent client to show current window activity timing. Subsequent display of specific detailed information of interest may then be available on demand. When a test is run, TCM platform 171 initiates a test case with call generator 173 and contact center manager (CCM) platform 174, which may each then begin their respective automated testing processes. Call flow generator 173 may simulate a plurality of virtual customers 180 which operate via a web server 179 and may send voice data requests pre-stored in a call flow testing data store 181. In the embodiment, all outbound and inbound voice data is transmitted through a data communications network 185 to the call interface 186 where they may be converted to PSTN transmission or may enter the internet based upon the test being run, while CCM platform 174 may similarly simulate virtual contact center agents 175 which may receive and respond to voice data requests by exercising various features of the contact center's customer relationship management software (CRM) in response to the test parameters. Data requests sent by simulated customers 180 arriving at the call interface 186 may be forwarded to an interaction server 176 and requests from agents to customers also via a call interface 186. Interaction server 176 may verify data requests with a call classifier 177, which may identify requests as part of a test case or actual contact center operations, to determine handling protocol. If a request is determined to be a part of a test case, interaction server 176 may then proceed with test case handling. If a request is inbound from call interface 186, it may be forwarded to CCM platform 174 for handling by virtual agents 175, or if it is an outbound request from a virtual agent 175 it may be sent to call interface 186 for transmission to a virtual customer 180. Virtual agents 175 may operate by interacting directly with interaction server 176 or by automatically interacting with a real or simulated agent desktop environment according to the specific nature of a test case. During and/or after the execution of a test case, data may be stored in a data store 172 by CCM platform 174 or call generator 173, for the formulation of test reports to be stored for later viewing by a user via TCM platform 171. In this manner, it will be appreciated that the flow of data requests within a test case is bidirectional, i.e. requests may continually and asynchronously be sent from simulated customers 180 to simulated agents 175 and vice-versa, without necessitating a strict pattern or rhythm of data flow. It will be appreciated that in such a manner it is possible to simulate a customer uttering multiple voice requests, requiring further CRM interaction while an agent attempts to fulfill a prior task, or for an agent to have to wait a customer produces needed data. Such occurrences are commonplace in practice, and in this manner, a test case may more accurately simulate actual contact center operations for more relevant and reliable testing data.

As illustrated, according to the embodiment, normal operations may continue uninterrupted within a contact center 170 while a test case is being performed. Customers 177 may continue to be served through the call interface 186 as normal without any impact on customer experience from a test case, calling to contact center agents 118 according to the flow illustrated. Calls may be sent from a call interface 186, and the calls may then be received and handled within a contact center. There the requests may then travel to an interaction server 176, which may then verify requests with a chat classifier 177 to determine their nature as legitimate customer interaction. Calls from real customers 187 may then be sent to agents 178, and voice responses follow an opposite path through interaction server 176, and then outward from contact center 170 via the call interface 186 to a customer's phone not shown. In this manner, it will be appreciated that normal contact center operations may be running in parallel to test cases, without any impact on customer experience.

Centralized deployment of all test set-up, initiation and status review is afforded by logically connecting the test system portal 150 and user interface 151 to the TCM Platforms 111, 171 of the test system. Remote review of test status as well as review of test results is also afforded by test system portal's 190 network connection 195.

DETAILED DESCRIPTION OF EXEMPLARY EMBODIMENTS

FIG. 2 is a system diagram illustrating exemplary use a plurality of headless web browsers to run specially developed web versions of the end-to-end voice and end-to-end chat test software, according to a preferred embodiment of the invention. The ability to reduce the number of software packages which must be monitored for changing hardware requirements, kept present and up-to-date in corporate workstation images and which must first be conflict as well as function tested and then deployed to workstations within a corporate department on disruption minimizing schedules has made web-browser based cloud CRM software-as-a-service offerings 210 such as but not limited to Salesforce and its many available add-ons for use in a contact center is extremely desirable. The invention allows a central module 100 to load and monitor multiple copies of specially developed web versions of end-to-end voice system test suite from storage 206, 207, which may be run continuously to test for time dependent issues such as race conditions and memory leaks, or an end-to-end chat and call contact test suite which may run continuously via a network 215 for the same reasons. In this embodiment 200 web versions of the test software 100 and the web-browser based cloud CRM software packages 210 may be loaded onto a plurality of workstations 220, 225 each running multiple instances of headless web browsers, as an example awesomium although the underlying headless web browser is not of consequence to invention function. Each of the workstations would then execute several iterations of the cloud-based CRM software of interest and the loaded thin client specialized test suite 220a, 220b, 220c, 220d, 220e, 220f, 220g, 225a, 225b, 225c, 225d, 225e, 225f, 225g. Such a configuration allows businesses to test the performance of web-based, thin client CRM solutions 210, as configured at their contact centers, under a variety of incoming and outgoing test loads of both customer chat and customer voice requests using an easy to configure and modify 151 command and parameter interface based test suite system that runs on a compact hardware platform 220, 225. The test suite may also be used to rapidly and thoroughly determine root cause of difficulties encountered by the call center while using the particular thin client CRM service 210 for accurate, informative defect reporting to the web-based CRM service provider without the expenditure of significant human or equipment resources. Results such as but not limited to web browser load on workstation resources, initial customer information screen presentation, proper operation of all support functions and windows can be easily monitored through dashboard of carrousel display formats allowing rapid recognition of outlying elements both during and post test run.

Figure 3:
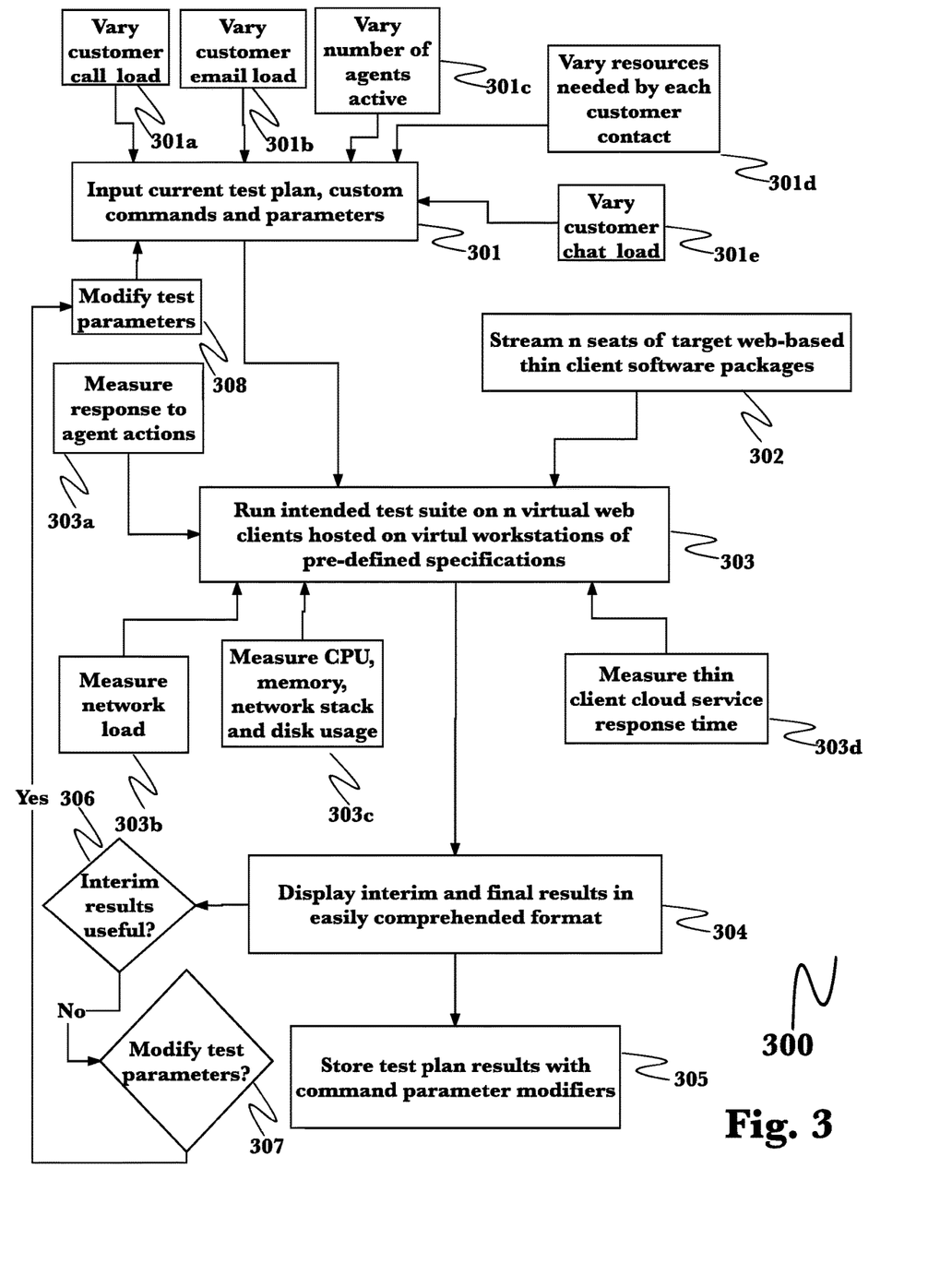
FIG. 3 is a flow diagram illustrating an exemplary method for using a plurality of headless web browsers to run specially developed web versions of the end-to-end voice and end-to-end chat test software, according to a preferred embodiment of the invention.

FIG. 3 is a flow diagram illustrating an exemplary method 300 for using a plurality of headless web browsers to run specially developed web versions of the end-to-end voice and end-to-end chat test software according to a preferred embodiment of the invention. There are several aspects of the operation of a call center that relies upon web-browser based cloud-service provided CRM that may affect the overall function of that call center. Embodiments of the test suite may thus commands and parameters to be specified during set-up 301 which direct the levels of such items as, but not limited to customer call load level 301a, customer email load level 301b, number of active agents 301c, customer chat message load level 301e, number of call center agents active (web-browser based CRM instances active and accepting customer requests) and the resources which may include information windows, database accesses and softphone communication connections open, just to name a few in use per customer 301d among other parameters known to those skilled in the art. Upon initial set-up of a test plan 301, that test may be run using a system of servers each running a target web-browser based, cloud service CRM 302 on multiple instances of headless, remotely controlled, web browsers 303, instances possibly representing workstations with different underlying capabilities FIG. 2. Items reported during runtime may include proper and timely web-browser client app responses to simulated agent actions 303a, call center network load during differing customer request profiles 303b, resource requirements on the web-browser based CRM host workstation during varying customer request and customer service profiles 303c and measurement of the response times of the cloud service during 24 hour cycles 303d among other parameters known relevant to one skilled in the field. Both interim, near real time, results of these individual analyses may be displayed 304 in an easy to rapidly recognize and comprehend format such as dashboards or carrousel formats with the ability to inspect more detailed representations available in many cases, during data acquisition 304. Interim results may be checked for usefulness 306, and if not useful 307 test parameters may be modified 308 so that operation repeats 301 with new parameter definitions. Both customized commands and parameters as well as pre-designated test results may be permanently stored 305. Stored commands and parameters 305 may be re-called and used as a basis of subsequent tests, either as-is, or modified with novel runtime commands or parameters as needed, to make the creation of test suites simple and time efficient for analysts having little or no programming knowledge or experience.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 4:
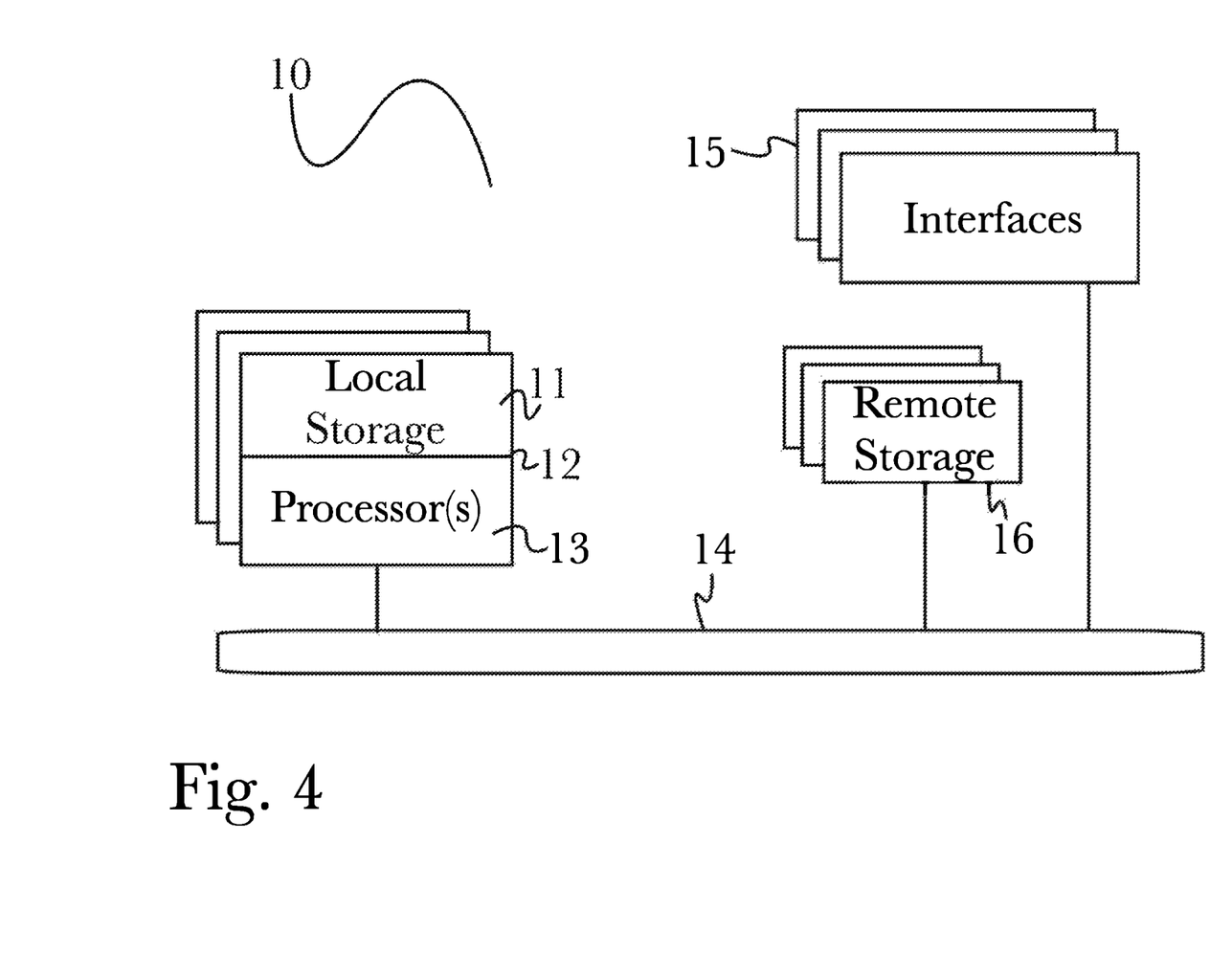
FIG. 4 is a block diagram illustrating an exemplary hardware architecture of a computing device used in an embodiment of the invention.

Referring now to FIG. 4, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (Wi-Fi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/N hardware interfaces) and, in some instances, volatile and/or non-volatile memory (e.g., RAM).

Although the system shown in FIG. 4 illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 5:
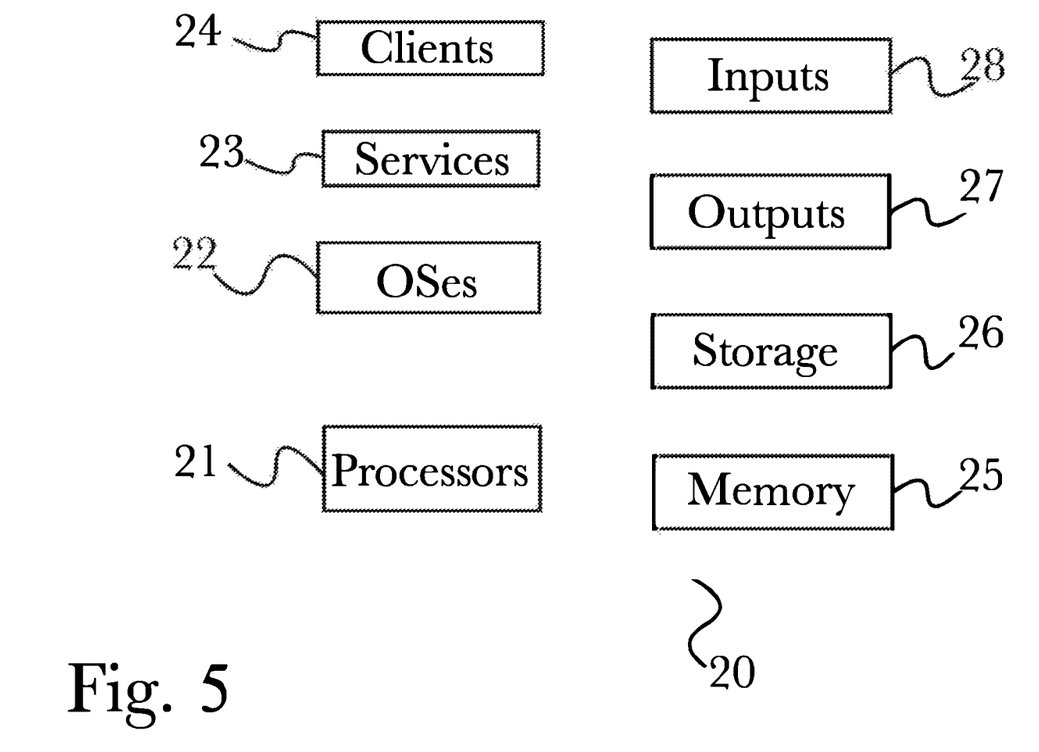
FIG. 5 is a block diagram illustrating an exemplary logical architecture for a client device, according to an embodiment of the invention.

In some embodiments, systems according to the present invention may be implemented on a standalone computing system. Referring now to FIG. 5, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of MICROSOFT WINDOWS™ operating system, APPLE OS X™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 4). Examples of storage devices 26 include flash memory, magnetic hard drive, CD-ROM, and/or the like.

Figure 6:
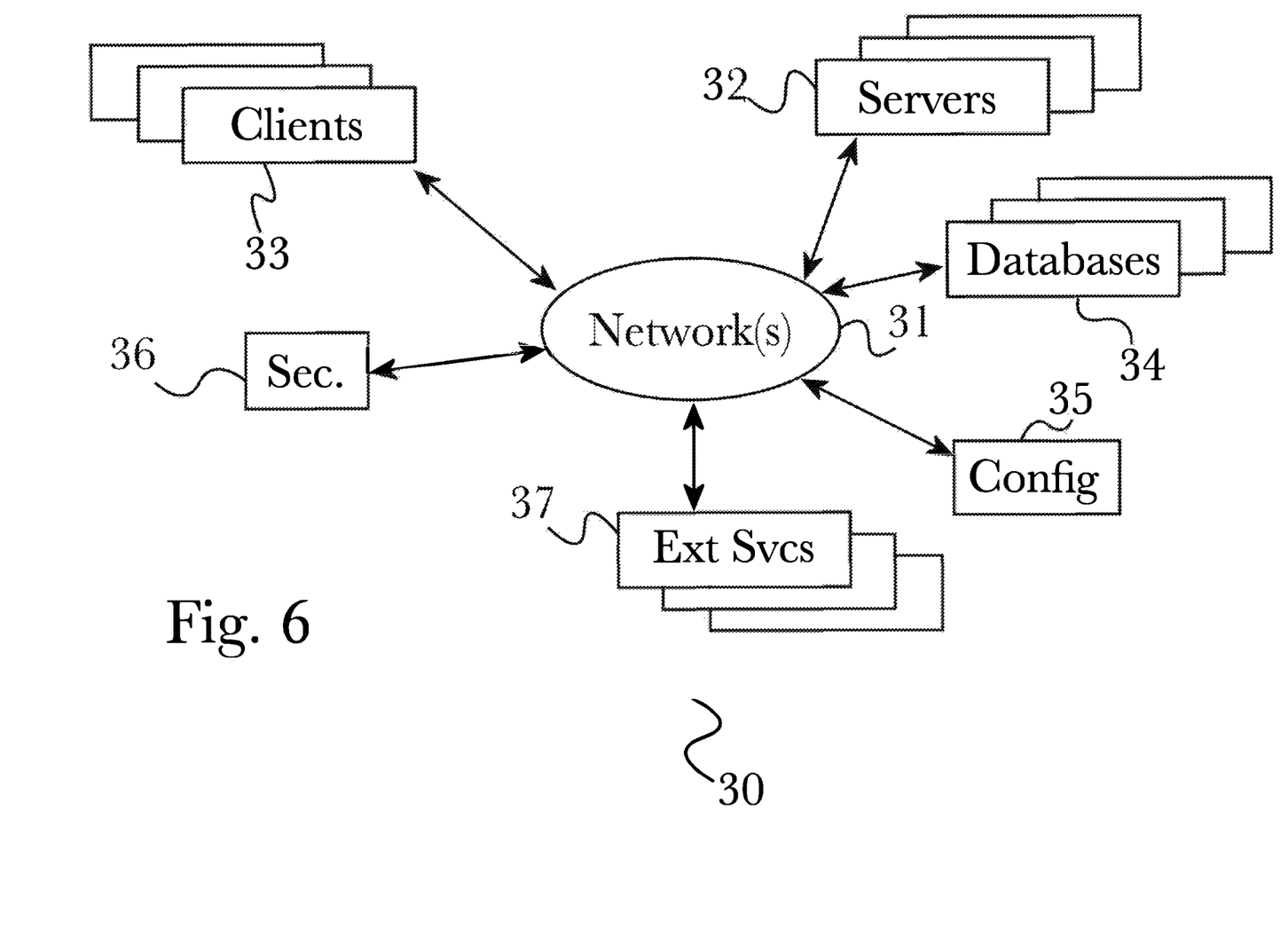
FIG. 6 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 6, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated in FIG. 5. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 7:
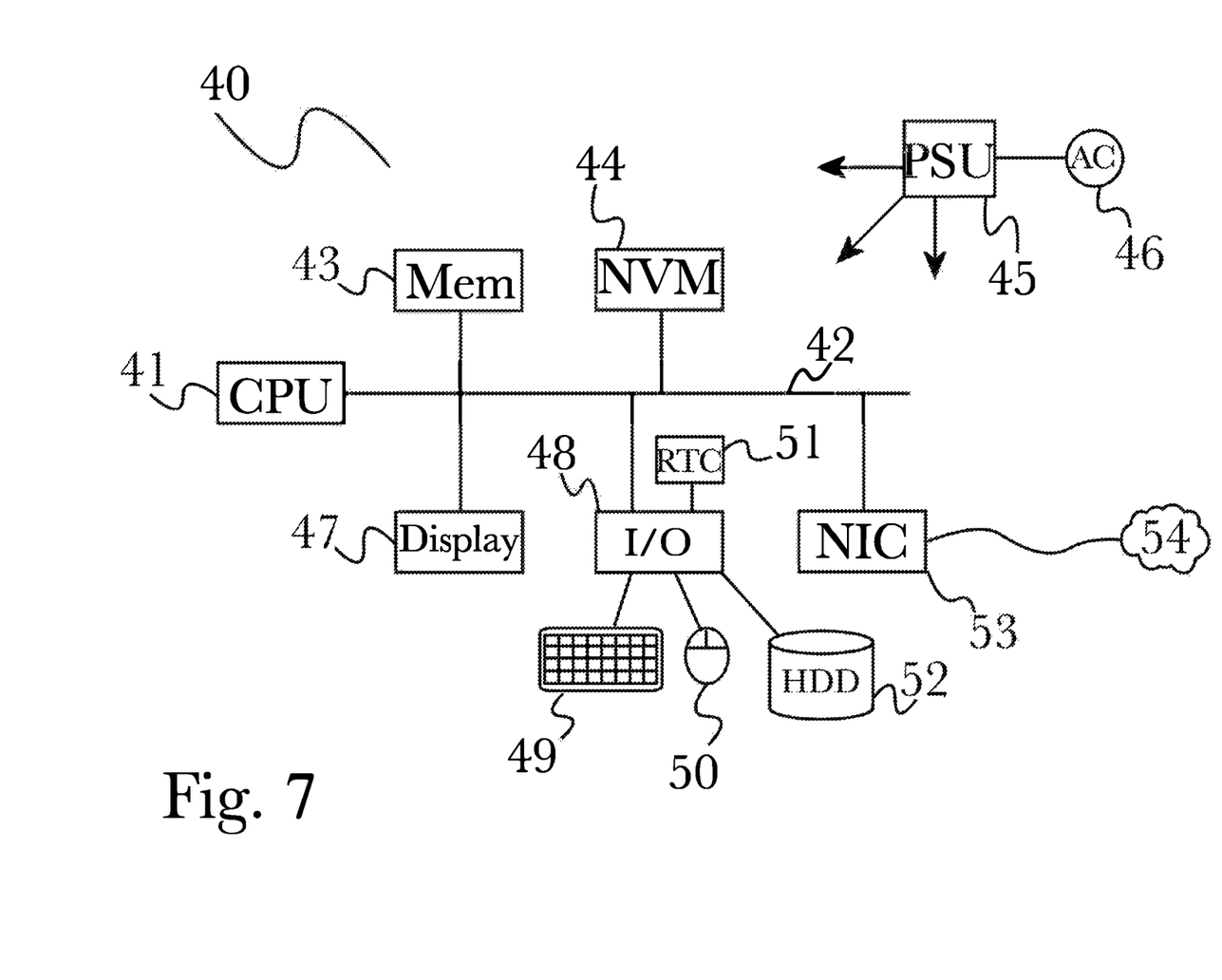
FIG. 7 is another block diagram illustrating an exemplary hardware architecture of a computing device used in various embodiments of the invention.

FIG. 7 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

The skilled person will be aware of a range of possible modifications of the various embodiments described above. Accordingly, the present invention is defined by the claims and their equivalents.

What is claimed is:

1. A system for automated virtualized contact center testing, comprising:
    a control portal module stored in the memory of and operating on a processor of a computing device and configured to:
        load a contact center configuration representing a contact center the contact center configuration comprising a plurality of agent workstations;
        accept interactive runtime commands directing the operation of a test of the contact center; and
        receive and display results of test operations performed by a web-based thin client test module; and
    a web-based thin client test module stored in the memory of and operating on a processor of a computing device and configured to:
        receive the interactive runtime commands;
        connect to a plurality of agent workstations at the contact center, each agent workstation being configured to utilize a web-based thin client customer relationship management solution;
        instantiate on each agent workstation a plurality of instances of a software testing package running on a headless web browser, the software testing package being configured to receive communications from a virtual customer of the contact center and record a response time of the web-based thin client customer relationship management solution, the number of instances of the software testing package being determined by the interactive runtime commands;
        create one or more instances of a virtual customer, the number of instances determined by the interactive runtime commands;
        run test operations indicated by the interactive runtime commands on each instance of the software testing package, the test operations comprising call center interactions between a virtual customer and an agent workstation utilizing the web-based thin client customer relationship management solution; and
        return results of the test operations to the control portal.

2. The system of claim 1, wherein at least a portion of the runtime commands may come from a test command data store.

3. The system of claim 1, wherein at least two runtime commands are strung together to form more complex, customized test suites where the test control module flags any incompatible combinations should they arise.

4. The system of claim 1, wherein results from several iterations of at least one test is stored to allow for retrospective analysis of efficiency changes over long periods of time.

5. The system of claim 1, wherein at least one of the runtime commands is graphically represented and selected by a pictogram.

6. A method for virtualized contact center testing, comprising the steps of:
    loading a contact center configuration representing a contact center the contact center configuration comprising a plurality of agent workstations;
    accepting interactive runtime commands directing the operation of a test of the contact center;
    connecting to a plurality of agent workstations at the contact center, each agent workstation being configured to utilize a web-based thin client customer relationship management solution;
    instantiating on each agent workstation a plurality of instances of a software testing package running on a headless web browser, the software testing package being configured to receive communications from a virtual customer of the contact center and record a response time of the web-based thin client customer relationship management solution, the number of instances of the software testing package being determined by the interactive runtime commands;
    creating one or more instances of a virtual customer, the number of instances determined by the interactive runtime commands;
    running test operations indicated by the interactive runtime commands on each instance of the software testing package, the test operations comprising call center interactions between a virtual customer and an agent workstation utilizing the web-based thin client customer relationship management solution; and
    receiving and displaying results of test operations.

7. The method of claim 6, further comprising the step of retrieving a portion of the runtime commands from a test command data store.

8. The method of claim 6, wherein at least two runtime commands are strung together to form more complex, customized test suites where the test control module flags any incompatible combinations should they arise.

9. The method of claim 6, further comprising the step of storing results from several iterations of at least one test to allow for retrospective analysis of efficiency changes over long periods of time.

10. The method of claim 6, further comprising the step of representing at least one of the runtime commands graphically and allowing selection using a pictogram.

* * * * *